US012511025B2

(12) United States Patent
Ramakrishnan et al.

(10) Patent No.: US 12,511,025 B2
(45) Date of Patent: Dec. 30, 2025

(54) SURVEILLANCE EVENT AGGREGATION AND DISPLAY

(71) Applicant: NASDAQ TECHNOLOGY AB, Stockholm (SE)

(72) Inventors: Priyadharshini Ramakrishnan, Lane Cove (AU); Leonid Soukhankine, Regents Park (AU)

(73) Assignee: NASDAQ, INC., New York, NY (US)

( * ) Notice: Subject to any disclaimer, the term of this patent is extended or adjusted under 35 U.S.C. 154(b) by 165 days.

(21) Appl. No.: 18/464,080

(22) Filed: Sep. 8, 2023

(65) Prior Publication Data

US 2025/0085838 A1    Mar. 13, 2025

(51) Int. Cl.
| | |
|---|---|
| G06F 3/048 | (2013.01) |
| G06F 3/04817 | (2022.01) |
| G06F 3/04845 | (2022.01) |
| G06T 11/20 | (2006.01) |
| G06Q 40/04 | (2012.01) |

(52) U.S. Cl.
CPC ...... G06F 3/04845 (2013.01); G06F 3/04817 (2013.01); G06T 11/206 (2013.01); *G06F 2203/04806* (2013.01); *G06Q 40/04* (2013.01)

(58) Field of Classification Search
CPC ............. G06F 3/04845; G06F 3/04817; G06F 2203/04806; G06T 11/206; G06Q 40/04
See application file for complete search history.

(56) References Cited

U.S. PATENT DOCUMENTS

| | | | | |
|---|---|---|---|---|
| 7,461,023 B1 * | 12/2008 | Helweg | ................... | G06Q 40/04 705/37 |
| 7,653,582 B2 * | 1/2010 | Costache | ............... | G06Q 40/04 705/36 R |
| 8,781,945 B2 * | 7/2014 | Preston | ................... | G06Q 40/00 705/37 |
| 11,144,336 B1 * | 10/2021 | Hu | ........................ | G06F 9/451 |
| 2003/0065608 A1 * | 4/2003 | Cutler | .................... | G06Q 40/06 705/37 |
| 2004/0122756 A1 * | 6/2004 | Creeden | ................ | G06Q 40/08 705/35 |
| 2005/0261999 A1 * | 11/2005 | Rowady | ................. | G06Q 40/00 705/35 |
| 2007/0203720 A1 * | 8/2007 | Singh | ..................... | G06Q 40/00 705/7.11 |
| 2007/0203816 A1 * | 8/2007 | Costache | ............... | G06Q 40/06 705/35 |
| 2008/0065510 A1 * | 3/2008 | Yu | .......................... | G06Q 40/04 705/26.1 |

(Continued)

FOREIGN PATENT DOCUMENTS

EP    1191466 A1 *  3/2002  ............. G06Q 40/04

*Primary Examiner* — Linh K Pham
(74) *Attorney, Agent, or Firm* — Nixon & Vanderhye, PC

(57) ABSTRACT

This disclosure describes a surveillance alert management user interface that automatically and dynamically aggregates alert information to provide enhanced capabilities in responding to such alerts. In one example, responsive to a first user input indicating zooming in on an indicated time interval that includes a first time sub-interval, a plurality of alert indicators is displayed instead of an aggregated alert indicator on a zoomed-in graph, where respective alert indicators of the plurality of alert indicators are correlated to respective second time sub-intervals within the first time sub-interval.

19 Claims, 12 Drawing Sheets

(56) References Cited

U.S. PATENT DOCUMENTS

| | | | | |
|---|---|---|---|---|
| 2009/0059731 A1* | 3/2009 | Bull | ..................... | G04G 13/026 |
| | | | | 368/73 |
| 2014/0159907 A1* | 6/2014 | Sykes | ................... | F01K 13/003 |
| | | | | 340/635 |
| 2015/0341212 A1* | 11/2015 | Hsiao | ................. | G06F 3/04842 |
| | | | | 715/735 |
| 2016/0086288 A1* | 3/2016 | Itri | ........................ | G06Q 40/12 |
| | | | | 705/30 |
| 2016/0247227 A1* | 8/2016 | Dalal | ..................... | G06Q 40/06 |
| 2016/0307173 A1* | 10/2016 | Chauhan | ................. | G06F 16/26 |
| 2016/0328954 A1* | 11/2016 | Ramadoss | .......... | G05B 19/0428 |
| 2017/0083974 A1* | 3/2017 | Guillen | ................. | G06Q 40/04 |
| 2017/0301024 A1* | 10/2017 | Dalal | .................... | G06Q 40/06 |
| 2018/0089328 A1* | 3/2018 | Bath | ..................... | G06F 16/901 |
| 2018/0316695 A1* | 11/2018 | Esman | ............... | G06Q 20/4016 |
| 2018/0356968 A1* | 12/2018 | Chiu | .................... | G06F 3/0482 |
| 2019/0238574 A1* | 8/2019 | Iliofotou | ................ | H04L 63/08 |
| 2021/0142400 A1* | 5/2021 | Kinker | ..................... | G06F 3/14 |

\* cited by examiner

```
interface IncomingData {
  time: number // time of the event(goes to milisecond precision)
  timeNano: number // 6 digits for time up to nanoseconds
  eventType: string // alert/news etc
  id: string | number | object // used when clicking to know what is clicked on
} interface OutData {
  x1: number // start postion for the bubble
  x2: number // end postion of the bubble
  y1: number
  y2: number
  icons: {
    eventType: string; // alert/news etc
    countWidth: number // width of the icon + number
  }[],
  events: Array<IncomingData> // the list of event
}
```

FIG. 10A

```
getChartDrawData(data)// run this function to work out the postion/size of the event bubbles
function getChartDrawData(incomingData: Array<IncomingData>){
  const outData: Array<OutData> = [];
  while(loop until we have read all the data in incomingData){
    let fit = false;
    const events: Array<IncomingData> = get first event
    let lastWidth = getIconEventsSize(events, chartDrawData[chartDrawData.length - 1]?.x2 ?? 0, 30);
    do {
      events = get the event within the lastWidth.x1 and lastWidth.x2 range
      const width = getIconEventsSize(events, chartDrawData[chartDrawData.length - 1]?.x2 ?? 0, 30);
      if(check if width and lastWidth are the same(if they are the same we have reached max bubble size) or have run 100 loops){
        push the width variable into outData
        fit = true // will make us exist the loop
      }
      lastWidth = width
      keep looping until width is the same lastWidth or we look 100 times
    } while(fit)
  }
  return outData;
}
function getIconEventsSize(events: Array<IncomingData>, lastOutData, lowestWidth){
  work out the width of the bubble given the events data
}
```

FIG. 10B

SURVEILLANCE EVENT AGGREGATION AND DISPLAY

CROSS REFERENCE(S) TO RELATED APPLICATION(S)

This application is related to the following applications, filed on even date herewith: U.S. design patent application Ser. No. 29/902,096; U.S. design patent application Ser. No. 29/902,097; U.S. design patent application Ser. No. 29/902,098; U.S. design patent application Ser. No. 29/902,099.

TECHNICAL OVERVIEW

The technology described herein relates to computer system event surveillance and management. More particularly, the technology described herein relates to event aggregation and display.

Introduction

Computerized securities trading systems are one example of high performance, high transaction volume computer systems for which efficient and effective surveillance capabilities is a key factor in enabling the system to operate at high performance with minimal downtime. Operators or other users may continuously monitor trading activity occurring on the computer system during the trading day and may additionally analyze collected information for surveilled aspects. It is important that the surveillance system provides its users with capabilities to detect, understand the context of, and respond to abnormal events that occur in the trading system based on collected data. It is also important to provide such capabilities with regard to real-time trading information.

Conventional surveillance tools display alerts as they occur, often resulting in crowded displays that prevent the operator from quickly and efficiently assessing the situation associated with particular alerts. The conventional tools rely on the operator to drill down on the interface to obtain clarity as to what alerts relate to what events and their respective times, and to search in various separate screens for contextual information to resolve or respond to the alerts.

With the rapid increase of the volume of transactions and the faster speeds of transactions (e.g., speed of transaction completion, speed with which participant/user systems or users respond to completed transactions, etc.) it is important that operators have monitoring and surveillance tools that can detect abnormal activities or activity patterns. It is also important for the systems to provide operators with the capability to effectively respond with sufficient information and in time. As noted above, conventional surveillance tools may not be adequate in the increasingly faster and higher volume system environments.

Accordingly, it will be appreciated that new and improved techniques, systems, and processes are continually sought after.

SUMMARY

According to one embodiment, a computer system comprising a processing system having instructions that, when executed by at least one hardware processor of the processing system, cause the at least one hardware processor to perform a sequence of operations is provided. The sequence of operations comprises displaying a user interface screen comprising at least a first graph, wherein the first graph plots a first characteristic of a first monitored item over a first time interval; displaying, on the first graph, a plurality of alert indicators correlated with respectively different time sub-intervals in the first time interval, wherein the plurality of alert indicators include at least one aggregated alert indicator displayed correlated to a first time sub-interval; responsive to a first user input indicating zooming in on an indicated time interval comprising the first time sub-interval: determining whether to disaggregate the at least one aggregated alert indicator; and based on the determining, displaying a second plurality of alert indicators instead of the at least one aggregated alert indicator on a zoomed-in first graph, wherein respective alert indicators of the second plurality of alert indicators are correlated to respective second time sub-intervals within the first time sub-interval.

According to another embodiment a method comprising a sequence of operations is provided. The sequence of operations comprises displaying a user interface screen comprising at least a first graph, wherein the first graph plots a first characteristic of a first monitored item over a first time interval; displaying, on the first graph, a plurality of alert indicators correlated with respectively different time sub-intervals in the first time interval, wherein the plurality of alert indicators include at least one aggregated alert indicator displayed correlated to a first time sub-interval; responsive to a first user input indicating zooming in on an indicated time interval comprising the first time sub-interval: determining whether to disaggregate the at least one aggregated alert indicator; and based on the determining, displaying a second plurality of alert indicators instead of the at least one aggregated alert indicator on a zoomed-in first graph, wherein respective alert indicators of the second plurality of alert indicators are correlated to respective second time sub-intervals within the first time sub-interval.

According to another embodiment, a computer readable storage medium that stores instructions that, when executed by a processing system, causes the processing system to perform a sequence of operations is provided. The sequence of operations comprises displaying a user interface screen comprising at least a first graph, wherein the first graph plots a first characteristic of a first monitored item over a first time interval; displaying, on the first graph, a plurality of alert indicators correlated with respectively different time sub-intervals in the first time interval, wherein the plurality of alert indicators include at least one aggregated alert indicator displayed correlated to a first time sub-interval; responsive to a first user input indicating zooming in on an indicated time interval comprising the first time sub-interval: determining whether to disaggregate the at least one aggregated alert indicator; and based on the determining, displaying a second plurality of alert indicators instead of the at least one aggregated alert indicator on a zoomed-in first graph, wherein respective alert indicators of the second plurality of alert indicators are correlated to respective second time sub-intervals within the first time sub-interval.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIGS. 10A and 10B show example pseudo code for event aggregation, in accordance with some embodiments.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Figure 2:
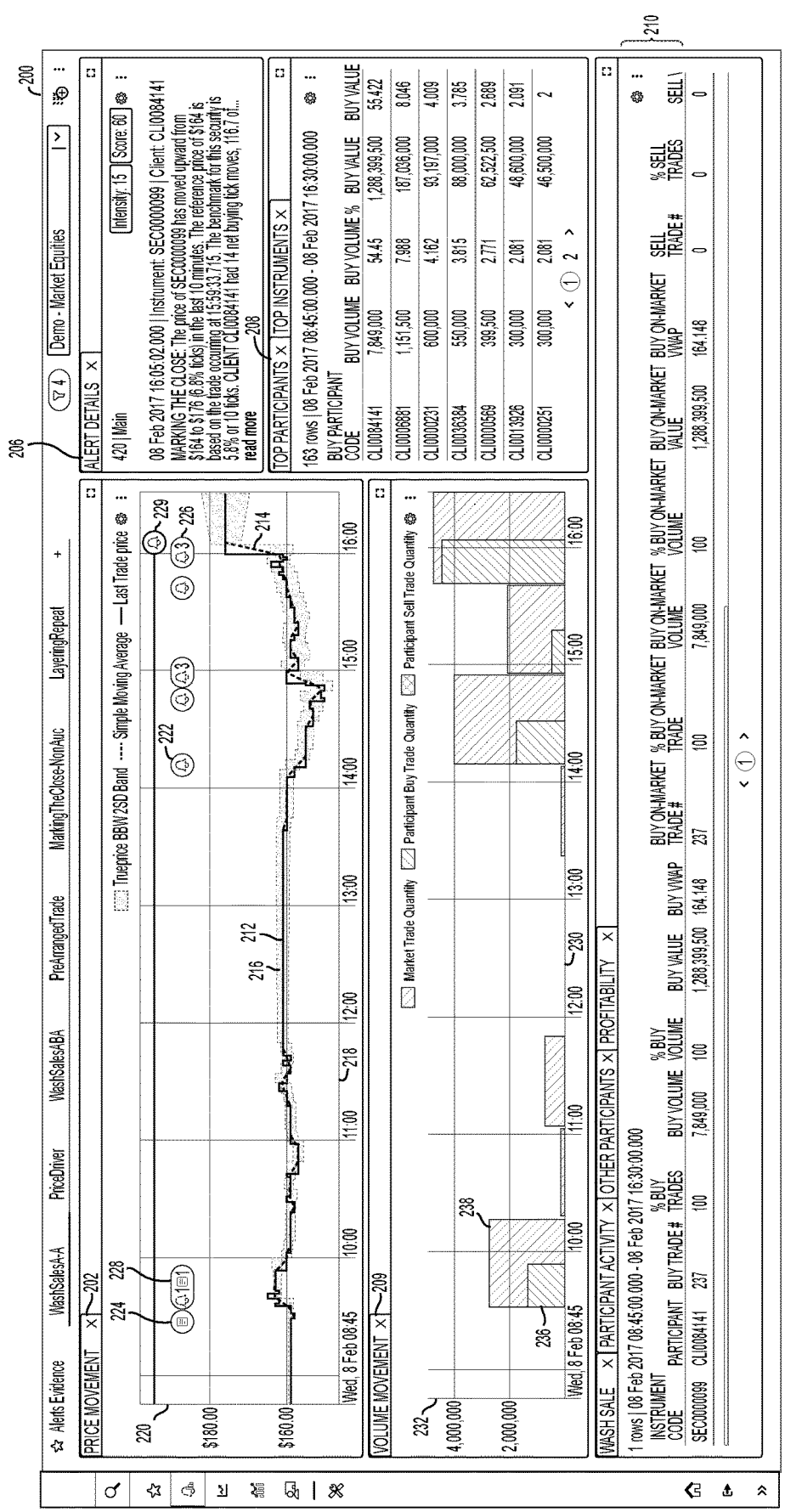
FIG. 2 shows an example surveillance screen with event aggregation displayed in a system such as the system of FIG. 1, according to some embodiments.

Sections are used in this Detailed Description solely in order to orient the reader as to the general subject matter of each section; as will be seen below, the description of many features spans multiple sections, and headings should not be read as affecting the meaning of the description included in any section. Some reference numbers are reused across multiple Figures to refer to the same element; for example, as will be provided below, the graph 200 first shown in FIG. 2 is also referenced and described in connection with FIG. 4.

Overview

This disclosure describes systems and techniques for processing, aggregating and displaying event information, such as, for example, surveillance alerts, that are generated for a high-volume high-speed computer system such as, but not limited to, an electronic securities trading system in a manner that enables improved response times by operators and other users.

Figure 1:
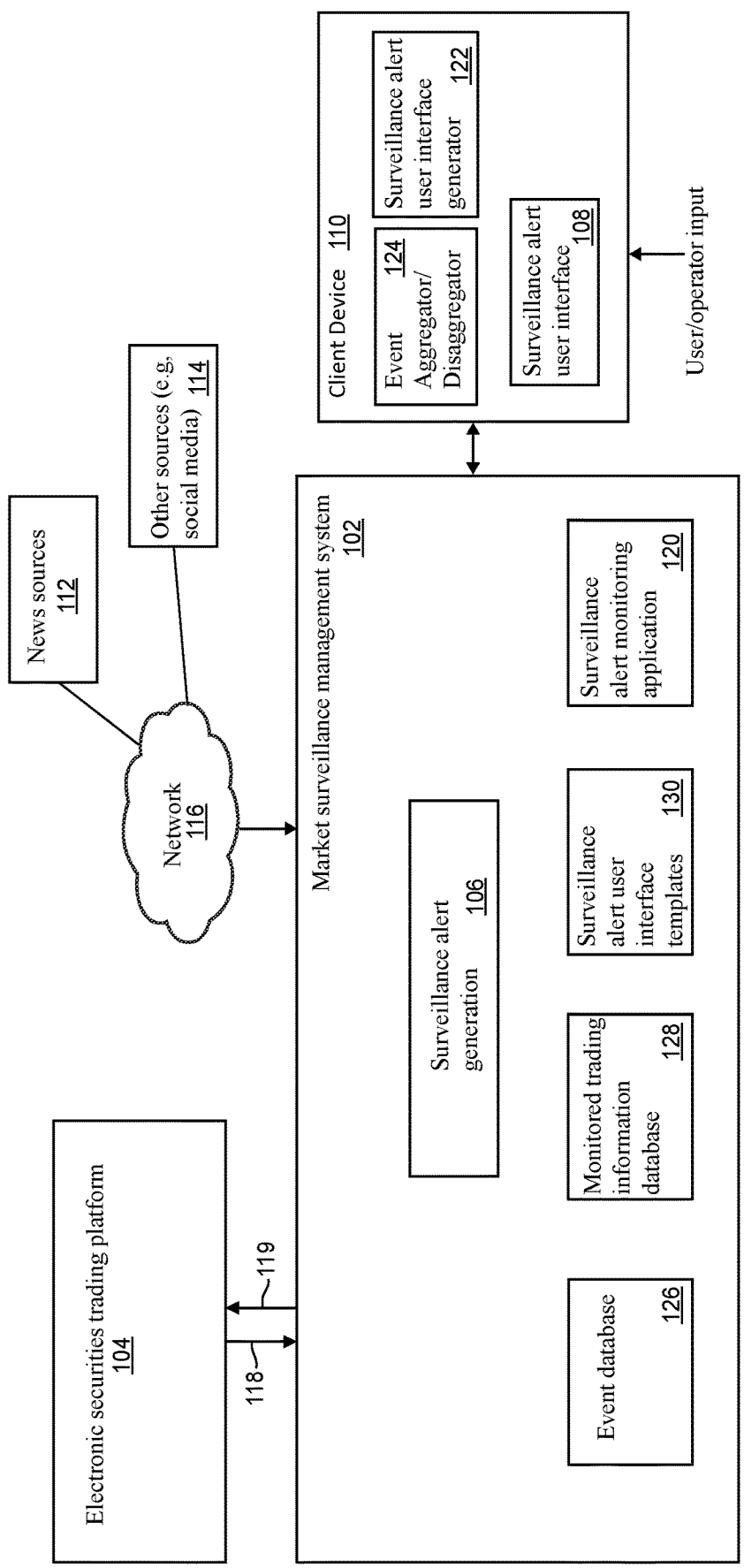
FIG. 1 shows an example surveillance management computer system that monitors an electronic securities trading system, according to some embodiments.

FIG. 1 shows an example surveillance management system that monitors an electronic securities trading system, according to some embodiments of this disclosure. The system can receive event information from a high-volume high-speed transaction processing system such as a real-time securities trading system and can generate a user interface that displays event-related alerts and information associated with such alerts in a manner that enables an operator or other user to clearly understand the context of a particular alert (or particular set of alerts) and respond to that in a timely manner, thereby improving the trading system's security and reliability, and also its performance and efficiency.

Figure 3:
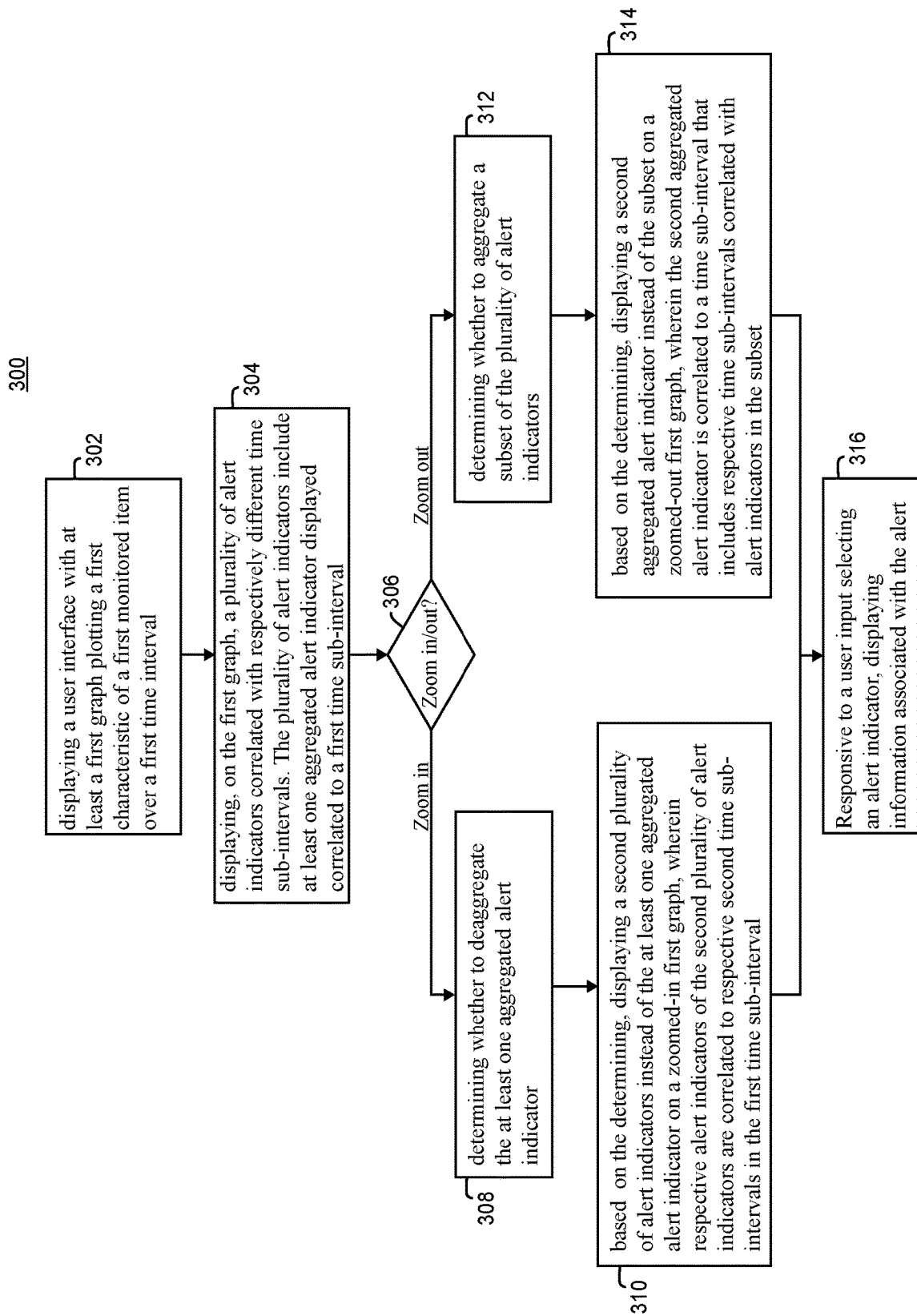
FIG. 3 shows a flowchart of a process for displaying surveillance information including generated alerts on a system such as the computer system of FIG. 1, according to some embodiments.
Figure 4:
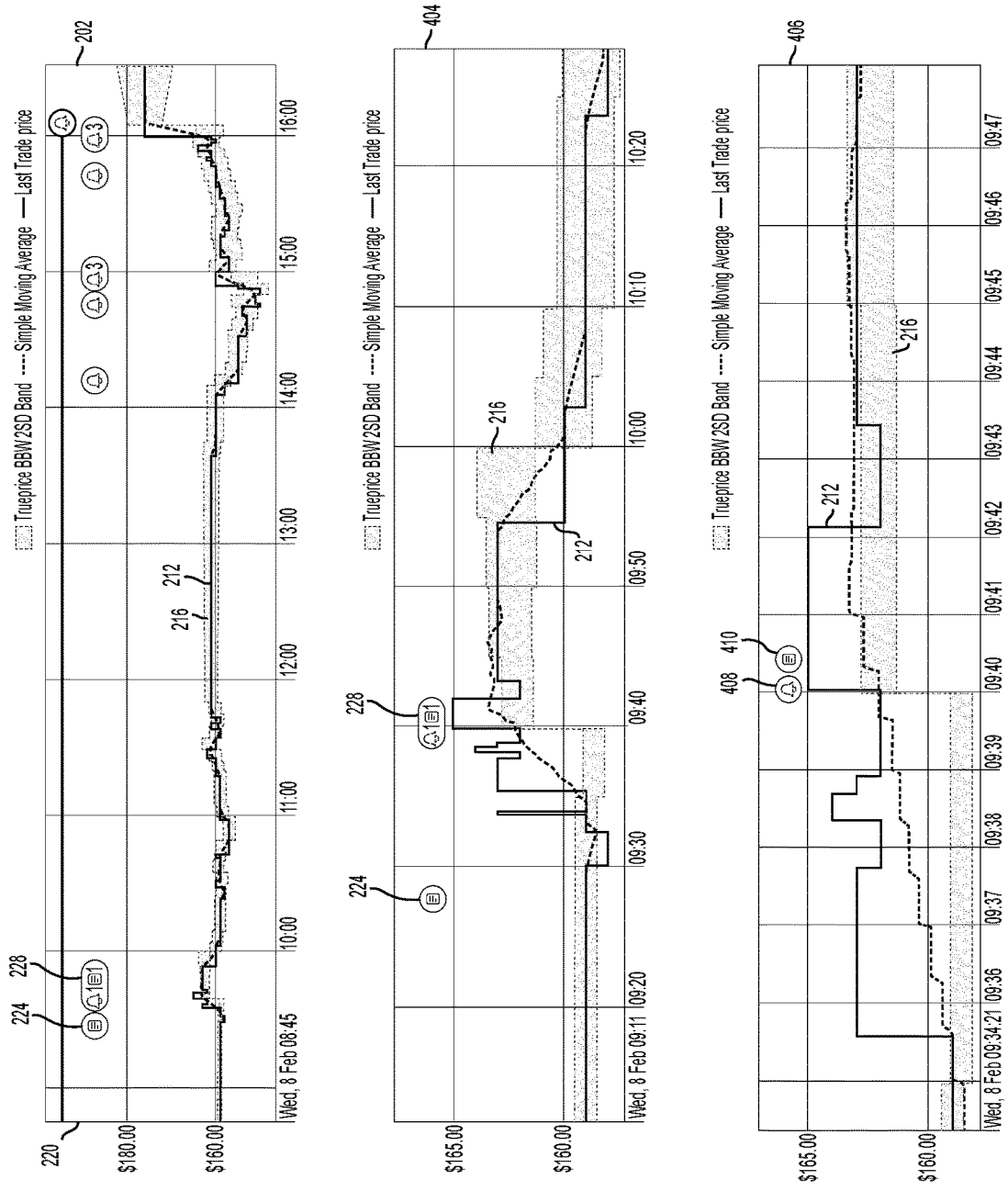
FIG. 4 shows examples of zoom-in capability of a surveillance screen such as the display screen in FIG. 2, according to some embodiments.
Figure 5:
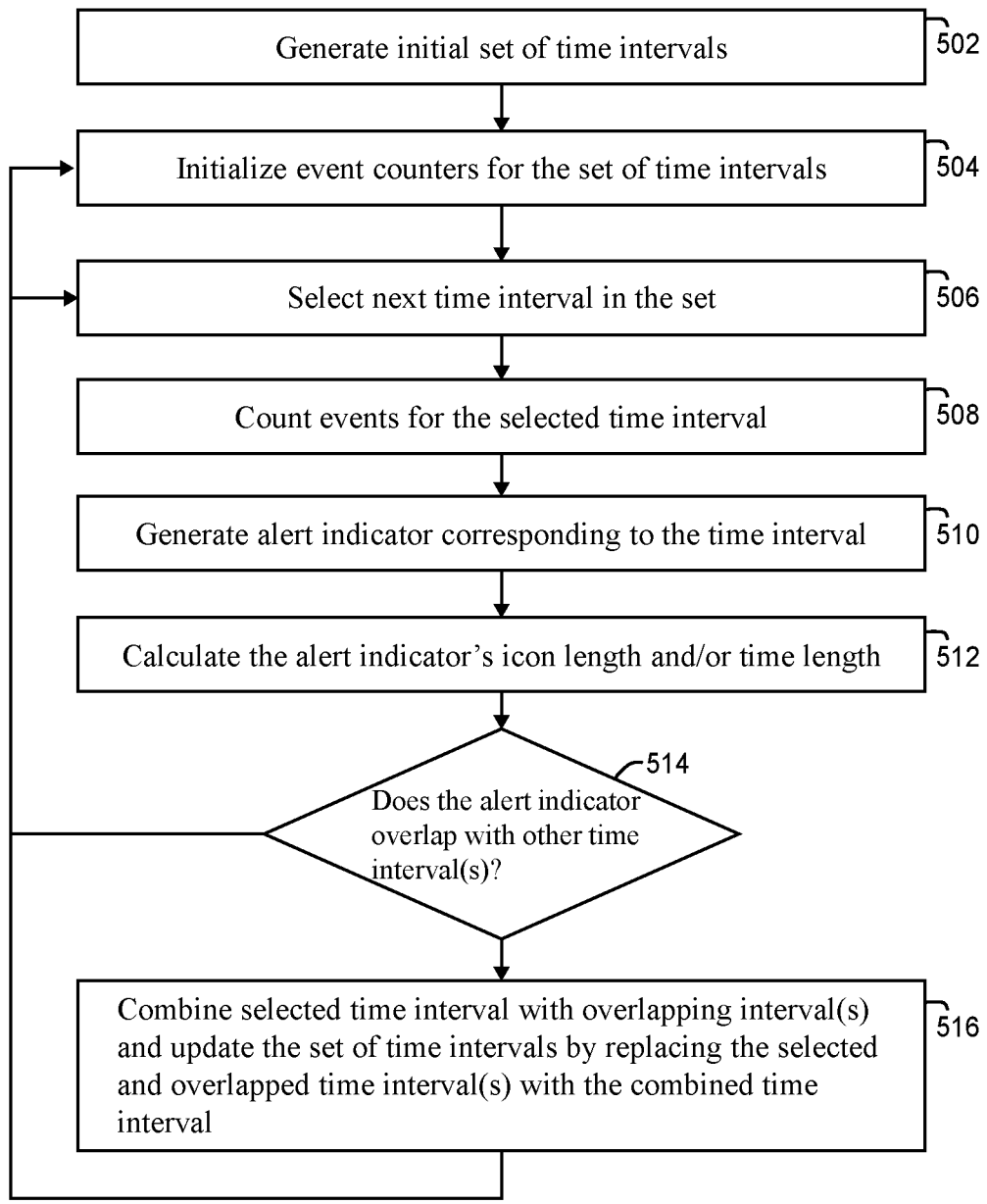
FIG. 5 shows an example process for displaying event alerts on a graph such as, for example, the graph in FIG. 2 so that the alerts can be responded to by an operator efficiently, according to some embodiments.
Figure 6:
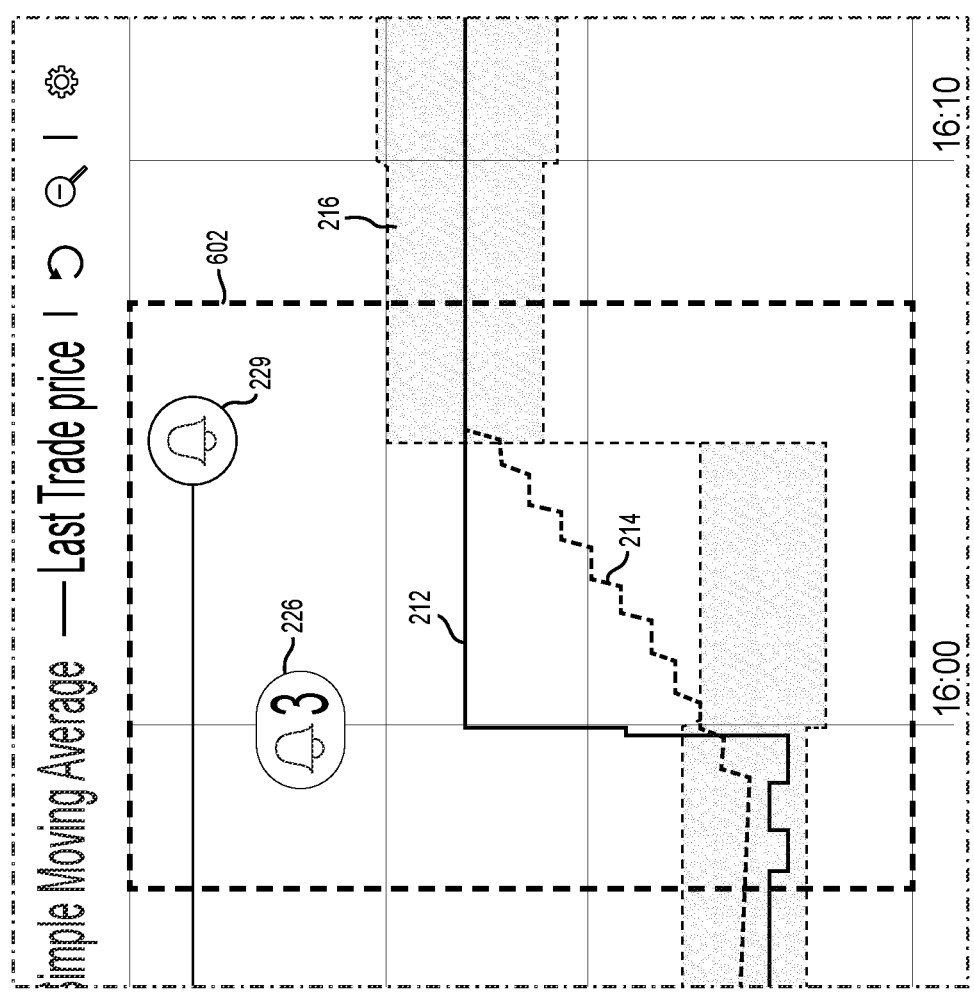
FIG. 6 shows an example selection of a time interval on a graph, such as that shown in FIG. 5, to be expanded, according to some embodiments.
Figure 7:
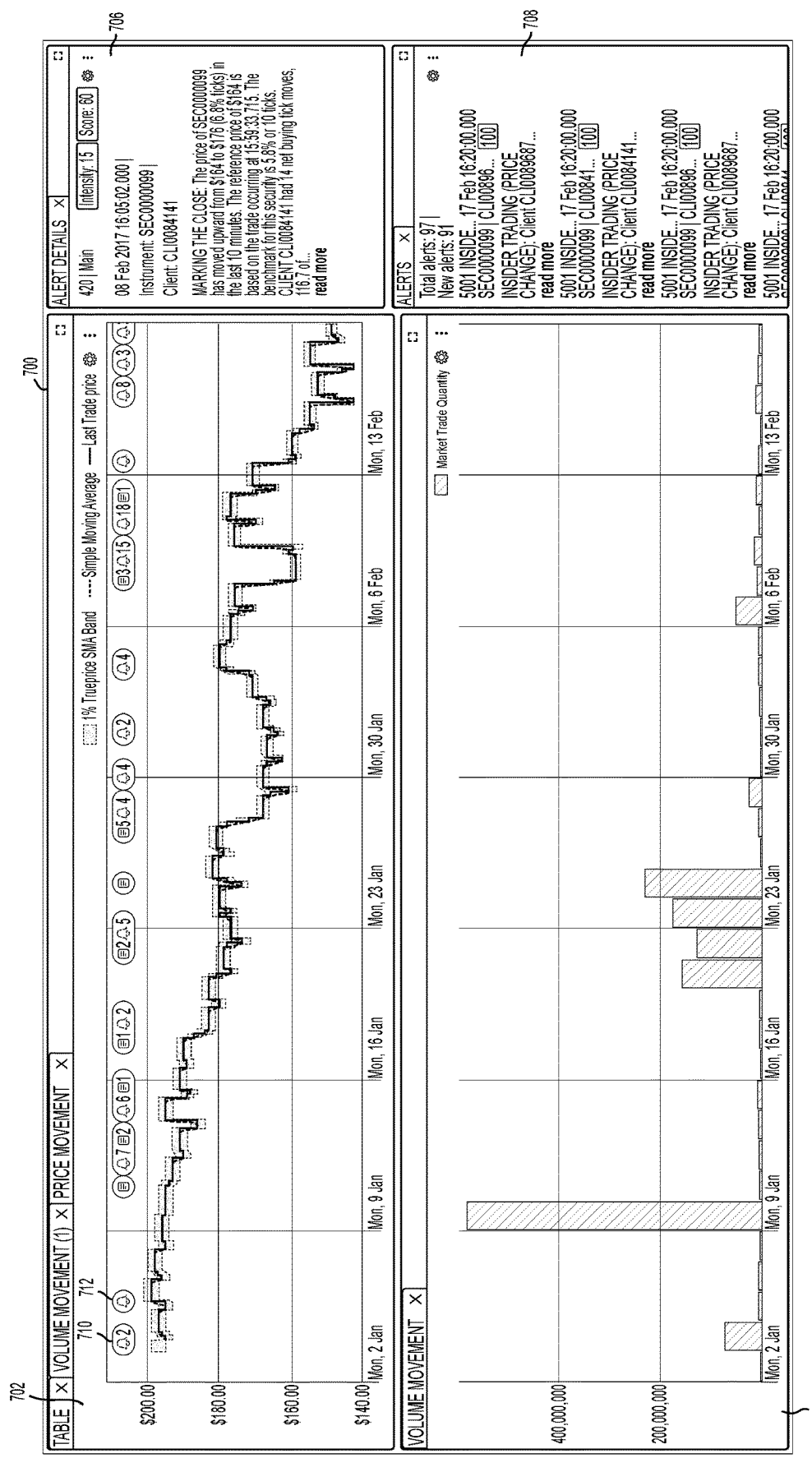
FIG. 7 shows an example display screen showing how event aggregation changes with graph size, according to some embodiments.
Figure 8:
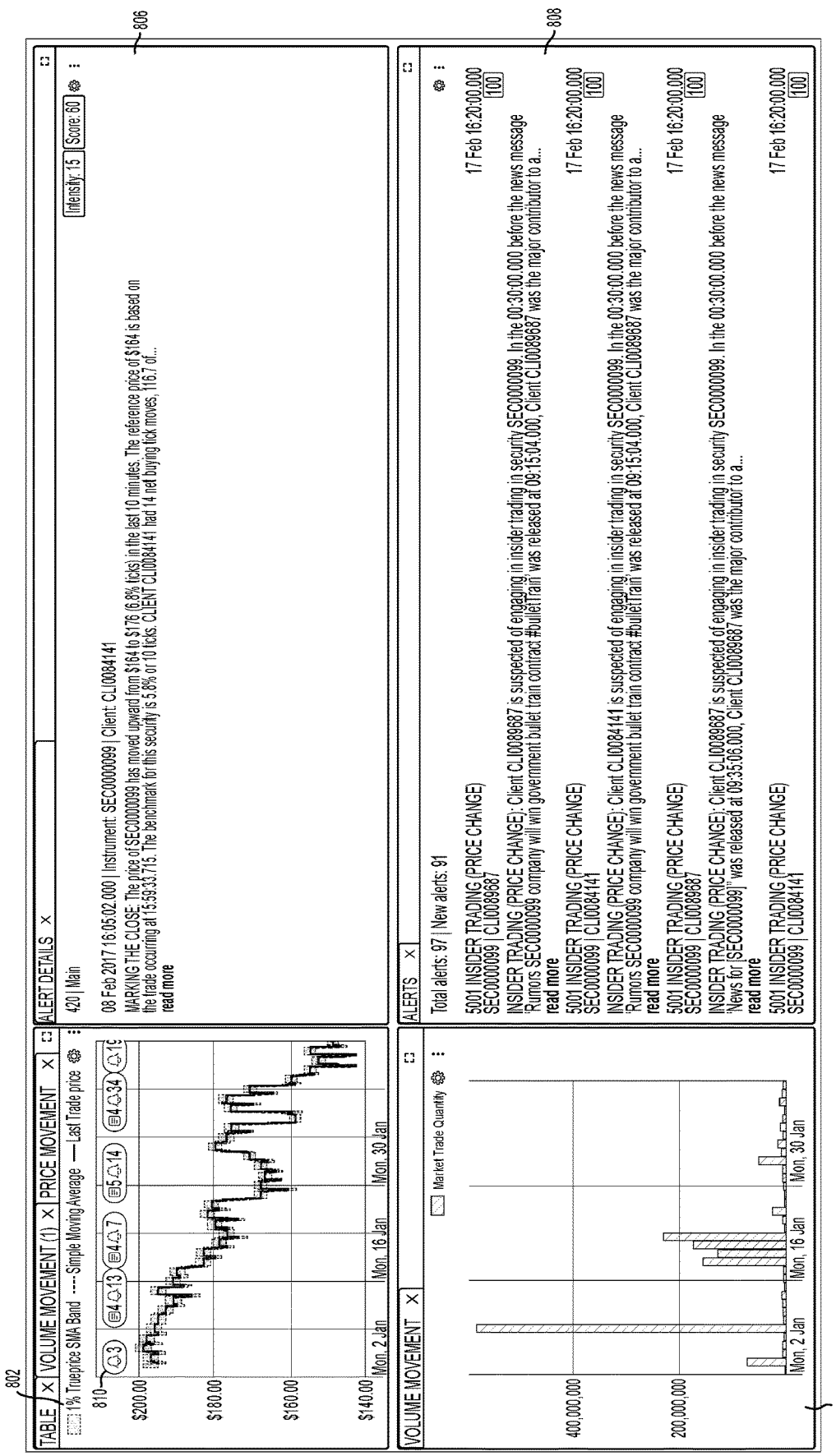
FIG. 8 shown another example display screen showing how event aggregation changes with graph size, according to some embodiments.
Figure 9:
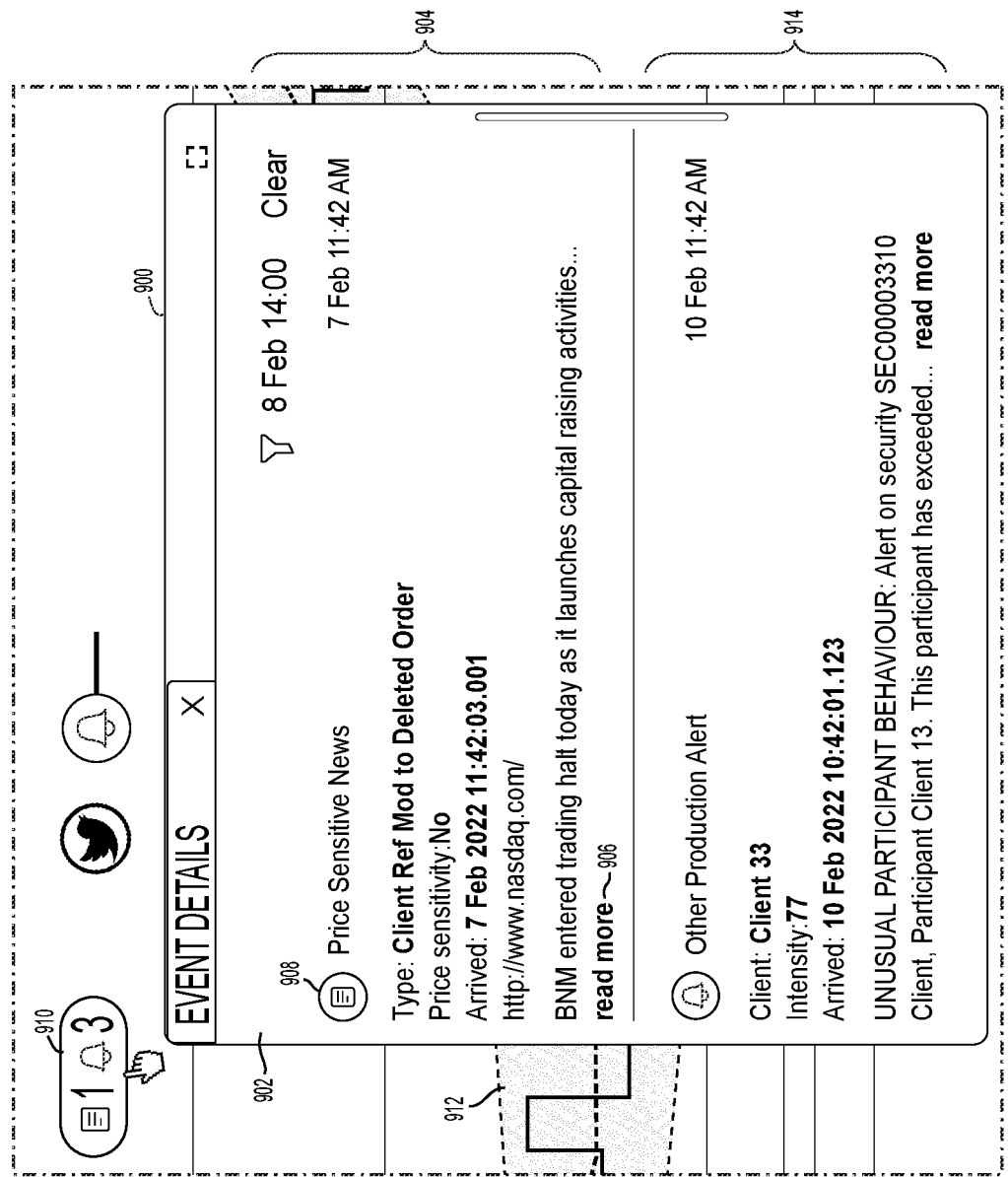
FIG. 9 shows displayed event details in response to clicking on a corresponding event alert, according to some embodiments.
Figure 11:
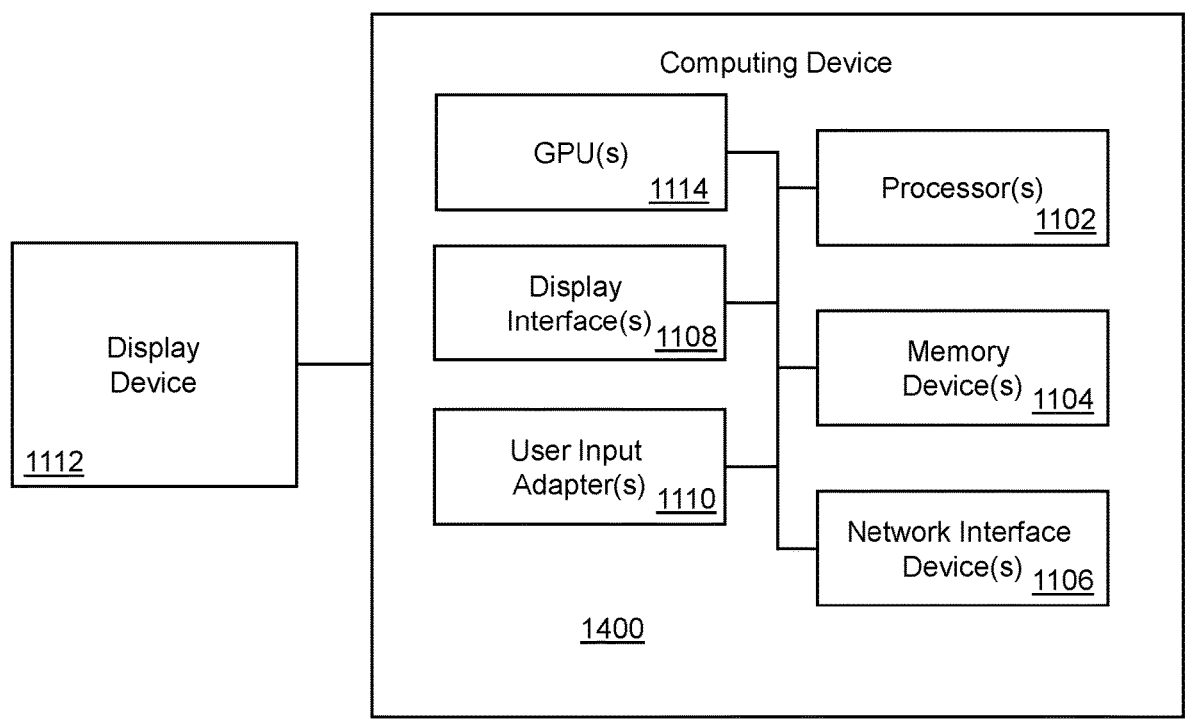
FIG. 11 shows an example computing device that may be used in some embodiments to implement features described herein.

FIG. 2 shows an example surveillance user interface screen with event aggregation displayed in a system such as the system of FIG. 1, according to some embodiments. The user interface of FIG. 2 adaptively aggregates events in time intervals so that the corresponding alert information can be displayed clearly, enabling efficient responses. The user interface may also gather the information most relevant to provide context to particular alert types on a single screen. FIG. 3 shows a flowchart of an example process for displaying surveillance information including generated alerts on a system such as the computer system of FIG. 1 on the user interface shown in FIG. 2. FIG. 4 shows examples of zoom-in capability of a surveillance screen such as the display screen in FIG. 2. The progressive zooming-in shown in FIG. 4 enables the operator to quickly and clearly isolate individual alerts while already having context information regarding nearby alerts. FIG. 5 shows an example process for displaying event alerts on a graph such as, for example, the graph in FIG. 2 so that the alerts can be responded to by a user/operator efficiently. FIG. 6 shows an example selection of a time interval on a graph, such as that shown in FIG. 5, to be expanded. FIG. 7 and FIG. 8 show example display screens illustrating how event aggregation changes with graph size. FIG. 9 shows an example event details panel that may be displayed in response to clicking on a corresponding event alert. FIGS. 10A and 10B show example pseudo code for event aggregation, in accordance with some embodiments. FIG. 11 shows an example computing device that may be used in some embodiments to implement features described herein.

In many places in this document, software (e.g., modules, software engines, processing instances, services, applications and the like) and actions (e.g., functionality) performed by software are described. This is done for ease of description; it should be understood that, whenever it is described in this document that software performs any action, the action is in actuality performed by underlying hardware elements (such as a processor and a memory device) according to the instructions that comprise the software. Such functionality may, in some embodiments, be provided in the form of firmware and/or hardware implementations. Further details regarding this are provided below in, among other places, the description of FIG. 11.

Description of FIG. 1

FIG. 1 shows an example surveillance management computer system 102 that monitors an electronic securities trading system 104, according to some embodiments. The computer system 102 may also be connected to news sources 112 and/or social media or other sources 114 via a network 116. The computer system 102 may communicate, over network 116 or other network, with a client device 110 on which the surveillance alert user interface 108 can be displayed. In some embodiments, computer system 102 includes its own display or connects to an external display on which the surveillance alert user interface 108 can be displayed.

The real-time electronic securities trading system 104 may include a matching engine on which a large volume or securities or other instruments are transacted at very high throughput. As is well known, systems such as system 104 have numerous stringent performance, reliability and security requirements. Performance requirements include minimizing any downtime of the system, and enabling high throughput and high transaction execution speeds. Reliability and security requirements include, among other aspects, monitoring and responding to suspicious activity by market participants. The surveillance management computer system 102 monitors the electronic securities trading system 104 in real-time and provides operators and other users (e.g., analysts) with the necessary information to rapidly identify and respond to various events that can affect the electronic securities trading system 104.

The surveillance management computer system 102 is configured to receive real-time trade information 118 from the trading system 104, and, at least in some embodiments, may transmit configuration or other control messages 119 to the trading system 104. In some embodiments, in addition to the trade information 118 (e.g., buy/sell orders, completed transactions, trade volume information, order book status), other information such as system resource status information (e.g., memory/processor status information, order processing software instance information, etc.) can also be received at the computer system 102 from trading system 104. Control messages 119 may include operator commands to enable or disable hardware or software resources, commands to control or manage the order processing, etc., that are issued by the operator or other users as a result of, or in response to, surveillance of the trading system 104.

A surveillance alert generation module 106 can reside on the computer system 102 to monitor transactions in real-time and, in response to trade information 118 and other information received from the trading system 104, generate an alert whenever an abnormal event occurs. Example abnormal events which may trigger the generation of alerts may include, but are not limited to, an abnormally high or abnormally low price shifts of a security instrument, abnormal volume of a single transaction or a group of transactions, or various other known abnormal transaction patterns for a security instrument. In some examples, in addition to transaction pattern related events being monitored, the surveillance alert generation module 106 may also monitor for abnormal delays in transaction execution, completion, etc. that may be indicative of system processing performance issues or system memory issues.

A surveillance alert monitoring application module 120 on the computer system 102 obtains event alerts generated by the surveillance alert generation module 106, processes the alerts, and provides for displaying a surveillance alert user interface 108 on which operators can monitor and/or respond to such alerts. The surveillance alert monitoring application 120 may correlate other information such as, for example, news items obtained from news sources 112 and social media posts obtained from social media or other sources 114 with event alerts, in order to provide the operator with more context surrounding the event alerts. The surveillance management computer system 102 may further include a an event database 126 that stores historical event alerts and other alert information received or determined by computer system 102, and a monitored trading information database 128 that stores historical trade information received from the trading system 104. In some embodiments, the computer system 102 may also include a surveillance alert user interface template database 130 that stores display templates that are selectable by event type.

The client device 110 may be configured to display the surveillance alert user interface 108 on its display device and provide for operators and other users to interact with the user interface 108 via touch screen or other input devices. The client device 110 may include a surveillance alert user interface generator 124 that generates and displays the surveillance alert user interface 108. The client device 110 and/or the surveillance alert user interface generator 124 communicates with the surveillance management computer system 102 and/or the surveillance alert monitoring application 120 to obtain the information and control information to be used for displaying the surveillance alert user interface 108. In some embodiments, the surveillance alert monitoring application module 120 on the computer system 102 provides alert information (e.g., event alerts, news alerts, other alerts, etc.) and associated trading information (e.g., trade prices, trade securities instrument information, simple moving average information, threshold bands for securities, etc.) to a surveillance alert user interface generator 124.

The surveillance alert user interface generator 124 generates the surveillance alert user interface 108 that is displayed on the display of client device 110. The surveillance alert user interface generator 124 interacts with the event aggregator 122 to obtain aggregated or disaggregated alert information (e.g., alert indicators and corresponding alert information) to be displayed and combines the alert information with other information to generate the user interface 108 (e.g., an example of which is shown in FIG. 2). The information for the various graphs and other panels of information may be obtained from real-time information received at the computer system 102 from the trading system 104 or from historical information in databases 126 and 128. As already noted, database 128, for example, includes historical information of transactions performed by the trading system 104, such as, for example, the last trade price per security and per participant, the simple moving average per security, and the normal threshold price bands per security, etc., and database 126 includes events generated by the trading system in association with the transactions. Database 126 may also store news items received from news sources 114 and other items received from other source 116 in relation with at least some of the stored events.

The event aggregator 122 is configured to aggregate and/or disaggregate alerts of multiple types (e.g., event alerts received from the trading system 104, news alerts from news sources 112, social media alerts from other sources 114, etc.) dynamically and adaptively in a manner responsive to user interface parameters (e.g., size and types of graphs, time interval granularity, etc.). It may be considered that a goal of event aggregations is to summarize discrete events instead of showing many individual icons in a timeline (e.g., as in conventional surveillance applications). In embodiments of this disclosure, the discrete events are initially aggregated using counts, and users are provided with the capability to view the underlying granular and more detailed information as needed by zooming in the area or clicking the alert indicator icons to view the associated event details. The event aggregator 122 may utilize real-time data from the trading system 104 and/or historical event information stored in the event database 126.

In some embodiments, the surveillance alert user interface is displayed by a browser running on the client device 110. The surveillance alert user interface generator 124 and event aggregator 122 may be included in one or more client-side web applications run by the browser. The surveillance alert user interface generator 124 and the browser may send requests to, and receive data from, the surveillance alert monitoring application 120 via a web server and/or application server that runs on the computer system 102 or other server platform that communicates with computer system 102. Messages between the web server and the browser may include HTTP messages or messages of another protocol for browser-web server communication.

FIG. 1 shows the surveillance management computer system 102 communicating with one trading system 104 and one client device 110. It should be understood however that the surveillance management computer system 102 is not limited to that, and may concurrently perform surveillance on any number of trading systems 104 and may enable any number of operators or other users to be connected via respective client devices 110. In some embodiments, surveillance management computer system 102 may be located or incorporated in a server infrastructure of an organization, and the client devices 110 may be connected either locally via a local network or remotely via the internet.

The example embodiments are primarily described in relation to surveillance of a securities trading system such as, for example, the securities trading system 104 and the monitoring of a securities instrument. However, embodiments are not limited thereto, and may apply to surveillance of any monitored characteristic over time and may utilize alerts generated based on the behavior of the monitored characteristic over time.

Description of FIG. 2

FIG. 2 shows an example surveillance alert user interface 200 with event aggregation being displayed by a system such as the surveillance management computer system 102 of FIG. 1, according to some embodiments. In some embodiments, the surveillance alert user interface 200 may be the surveillance alert user interface 108 that is displayed on client device 110 shown in FIG. 1.

The surveillance alert user interface 200, in some embodiments, may be considered an "evidence card" that uses visual storytelling to simplify the alert investigation process by distilling complex information into clear mitigating or aggravating pieces of evidence associated with behaviors detected by the system. Evidence cards are designed as templates for various detection types providing key information for the scenarios themselves, as well as contextual details about the instruments and participants involved.

The surveillance alert user interface 200 comprises a monitored characteristic graph 202. In the illustrated example, the monitored characteristic is the price of a selected securities instrument (e.g., stock etc.). The last trade price of the selected securities instrument is plotted with the x-axis 218 being time and the y-axis 220 being the price to obtain the price movement relationship 212 (in solid line). The moving average 214 (in dashed line) may also be plotted on the same graph. The normal value band 216 shows the high and low threshold values (e.g., a predefined number of standard deviations above and below the average trade price) that would be considered usual or expected based on historical behavior and other factors. As can be seen in the illustrated graph, the simple moving average 214 of the price of the selected securities instrument is within the normal value band 216. As can also be seen the last trade price 212 is also within the bounds of band 216 for most of the entire displayed time interval (e.g., 08:45 to after 16:00 hours on Wednesday February 8, as shown on the graph) for which plots 212, 214, and 216 are displayed. However, as can be seen in graph 202, the last trade price 212 is outside of the bounds at neat 16:00 hours indicating an abnormal event for which an alert may be generated.

If any alerts occurred during the entire displayed time interval, then the monitored characteristic graph 202 additionally shows the occurrence of alerts. For example, alert indicator (also referred to as "alert icon") 222 is arranged close to 14:00 hrs, illustrating that an event alert was triggered at that time either due to the occurrence of some event that has a potential impact on the price of the selected securities instrument, or due to some other predefined event triggering criteria (e.g., abnormal price and/or volume) being met in the trading of the selected securities instrument. Additional alert indicators are also arranged between 8:45-10:00 hrs, close to 15:00 hrs, and between 15:00-16:00 hrs. One or more alerts represented in alert indicator 226, for example, may be due to the last trade price 212 moving out of the band 216 at close to 16:00 hrs. Still another alert indicator 229 is arranged at 14:05 hrs.

In the illustrated example, the alert indicator 229 has been selected, for example, by the operator by selection (e.g., mouse click on the alert indicator 229). The appearance of the alert indicator 229 may be changed to be different from other (non-selected) alert indicators to indicate that the alert indicator 229 is currently in a selected state. In the illustrated example, the fill color of the alert indicator 229 has been changed from white to blue but this disclosure does not limit how the selected alert indicator is identified. In the illustrated embodiment, selecting the alert indicator 229 displays the alert detail display panel 206. As shown, the alert details panel 206 may show detailed information such as, for example, any of date and exact time of alert, associated securities instrument(s), associated client(s) and/or participant(s), values of one or more monitored metrics at the time of the alert, and potential reasons for the alert.

The surveillance alert user interface 200 may also have the capability to show the occurrence of news items and/or other factors such as, but not limited to, social media posts etc., that may affect the price of the monitored securities instrument. The occurrence of news items may be indicated by news alert indicators (e.g., news alert indicator 224). Alert indicators may also be shown for other factors such as, for example, social media posts that may affect the price of the monitored securities instrument. Each type of alert indicator (e.g., event alert, news alert, social media alert, etc.) may have a respectively different symbol. For example, in the illustrated example, event alert indicators include a bell icon (e.g., alert indicator 222), and news alert indicators include a note icon (e.g., alert indicator 224).

In an embodiment, when an alert indicator is representing a single occurrence of the alert, the alert indicator may include only the appropriate symbol. When an alert indicator represents more than one occurrence of the alert, the alert indicator includes the appropriate symbol and a number indicating the number of occurrences. For example, the alert indicators 222 and 224 represent one each of an event alert and a news alert, respectively. The alert indicator 226 includes the bell symbol and number 3, representing three occurrences of event alerts during the corresponding time sub-interval.

In some instances, an alert indicator may represent alerts of a plurality of types. For example, alert indicator 228 represents the occurrence of an event alert and a news alert in the corresponding time sub-interval.

In some embodiments, the surveillance alert user interface 200 may include more than one graph. In the example illustrated, a volume movement graph 204 is displayed to provide the user/operator with more information helpful to understand the context for various alerts. The volume movement graph 204 plots the trade volume (y-axis 232) over time (x-axis 230) to display the volume of the selected securities instrument (e.g., securities instrument shown in the monitored characteristic graph 202) traded (buy or sell) by a selected participant (e.g., volume 236) and the total trade volume (e.g., volume 234). By arranging the volume movement graph 204 to have its x-axis 230 parallel to the x-axis 218 of the monitored characteristic graph 202, and by plotting the same time interval, the user/operator is provided with more visual time-correlated information so that the operator's contextual understanding of the alerts is improved and made faster.

In some embodiments, the surveillance alert user interface 200 incudes additional panels such as, for example, participant activity panel 210 and top participants panel 208. The participant activity panel 210 may list details of each trade made by a selected participant in the displayed entire time interval or a selected time sub-interval thereof. The top participants panel 208 may list a predefine number of most active participants having highest volumes of trades of the monitored securities instrument in the displayed entire time interval or a selected time sub-interval, or all participants having trades of the monitored securities instrument displayed entire time interval or a selected time sub-interval. Other panels of information that may be displayed include top instruments traded in the displayed entire time interval or a selected time sub-interval, transactions of other participants in the displayed entire time interval or a selected time sub-interval, wash sales in the displayed entire time interval or a selected time sub-interval, etc.

By using event aggregates, operators and other users (e.g., analysts) are provided with an overview of the events (e.g., event alerts and related news announcements and social media updates) in the timeline in relation to the price movement of the securities instrument and corresponding participant trade information (e.g., buy and sell information). Instead of analyzing each individual event separately, the users can focus on the high-level patterns—enabling them to perform first-pass analysis of the alerts more efficiently and quickly. The event aggregates also reduce visual clutter and cognitive load.

Thus, the surveillance alert user interface 200 provides for aggregating discrete events using a count per event type on a specific time granularity. On zooming in or filtering on a detailed time interval, the aggregated events are displayed as separate instances depending on the time granularity. An aggregation/number displayed on an event on the zoomed in view shows that they can be zoomed in further. In addition, the details of a specific alerts or news event can be viewed in a list view via an event detail panel. Additionally, multiple event types are grouped into one alert indicator (icon) when there are different event types occurring during the same time. This helps prevent overlaps of icons and clearly show the summary by event types.

A conventional alert management user interface may plot each and every alert individually. In time intervals in which numerous alerts are generated in for a monitored system this conventional technique of alert display can get very crowded with alert indicators overlapping each other. Under such circumstances the operator may miss alerts that are not highlighted in some manner. Moreover, the operator would spend considerable time selecting and identifying each individual alert before the most important or sensitive alerts can be identified. Surveillance alert user interfaces according to embodiments (e.g., user interface 200), in contrast, enable operators to quickly and efficiently identify, isolate and respond to such alerts even when numerous alerts are generated in a particular time interval. This enhanced capability is enabled by a process of aggregating alerts in time buckets (see, for example, FIG. 3 and FIG. 5 with related descriptions) in a manner that is different from conventional systems and moreover by dynamically adapting the process of aggregating alerts in time buckets in a manner that is responsive to alerts in other time buckets and the size and layout of associated graphs (see, for example, discussion of FIGS. 7 and 8) that display the monitored characteristics. The enhanced capability is enabled additionally in some embodiments by, in contrast to conventional systems in which the operator has to select overlapping individual alert indicators in a time bucket one by one to have their respective information displayed, providing for the alert information of all the individual alerts to be shown in a single alert details panel in response to the operator selecting a corresponding aggregated alert indicator, thereby enabling the operator to more quickly view details of all the individual alerts represented in the aggregated alert.

In modern networks, operators are often in situations where they are even temporarily limited to small screen sizes (e.g., tablets, smartphone, etc.). The example processes described in FIG. 3 and FIG. 5 provide for aggregated alert indicators that presents to the operator a clear, easily comprehensible view of system alerts in a manner that is adaptive even to smaller screen sizes. For example, in some embodiments, the process of displaying alerts is responsive to the volume of alerts in particular time buckets and also to available display space for the graphs, and can dynamically expand the time bucket over which aggregation is performed for a particular aggregated alert indicator in a manner that is adaptive to the size of alert indicators in terms of pixel length or length in time relative to the graph's time granularity.

A surveillance alert user interface according to embodiments (e.g., user interface 200), may improve the speed and responsiveness of the computer system on which it is executed relative to conventional techniques. When rendering the user interface in a time bucket that has dozens of alerts, rendering only a single icon of an aggregated alert can be performed efficiently. In contrast, conventional systems may iterate over a list of the dozens of alerts to render the corresponding alerts one by one to the user interface (e.g., over numerous processor cycles). Additionally, an aggregated alert indicator that represents dozens of individual alert indicators as in embodiments may have a substantially smaller memory footprint than the collection of individual alert indicators that are represented in the aggregated alert indicator. The improved rendering speeds of the user interface may also improve the speed with which the incoming real-time event alerts can be displayed on the user interface, thereby improving the responsiveness of the system to real-time events.

Description of FIG. 3

FIG. 3 shows a flowchart of a process 300 for displaying surveillance information including generated alerts on a system such as the computer system of FIG. 1, according to some embodiments. Process 300 may, for example, be performed by client device 110 using the surveillance alert interface generator 124 and event aggregator 122 modules. A processing system of client device 110 may run process 300 thereby providing for displaying the surveillance alert user interface 108 on a display on the client device. As noted above, the surveillance alert user interface 200 shown in FIG. 2 may be an example of the surveillance alert user interface 108.

Process 300 may begin at operation 302. At operation 302, the processing system displays a user interface screen with at least a monitored characteristic graph that plots a monitored characteristic (e.g., price of a securities instrument) over time. An example monitored characteristic graph was described in relation to FIG. 2 above (e.g., monitored characteristic graph 202 displayed in the surveillance alert user interface 200).

At operation 304, the processing system displays on the monitored characteristic graph a plurality of alert indicators correlated with respectively different time sub-intervals. The displayed plurality of alert indicators may include at least one aggregated alert indicator that is displayed correlated to a first time sub-interval. For example, in the monitored characteristic graph 202 displayed in the surveillance alert user interface 200, a plurality of alert indicators including alert indicators 222-229 are displayed above the monitored characteristic (e.g., price movement 212) in correlation to the time on the x-axis. Aggregated alert indicator 226 represents that three alerts have occurred in the time sub-interval corresponding to its location. Aggregated alert indicator 228 represents that one event alert and one news alert occurred in the time sub-interval corresponding to its location.

At operation 306, a user input is detected and it is determined whether that user input corresponds to a zoom-in operation or a zoom-out operation. In one embodiment, the operator may use a pinch/contracting movement with two fingers (e.g., the two fingers start further apart and then move closer together) on a touch screen display that has the monitored characteristic graph displayed to communicate a zoom-out request, or an expand movement with two fingers (e.g., the two fingers start closer together and then spread out) on the touch screen to communicate a zoom-in request. The starting point of the two fingers may indicate the time interval to be zoomed in or zoomed out, and the difference in the space between the two fingers at the beginning and the end may represent the amount of zoom in or zoom out to be performed. In some embodiments, the operator may indicate a time interval using an input device such as a mouse, and then select a zoom-in or zoom-out as desired. In yet other embodiments, the parameters (e.g., time interval, expansion or contraction amount) can be specified before selecting a zoom in or zoom out operation.

When a zoom-in operation is indicated, at operation 308, it is determined whether a disaggregation of one or more alert indicators is required. For example, if a zoom-in of the time sub-interval that includes either the aggregated alert indicator 226 or aggregated alert indicator 228 is selected, then it may be determined that disaggregation of the corresponding aggregated alert indicator can be performed. Factors that determine whether a disaggregation is to be performed may include the presence of an aggregated alert indicator in the time interval selected for zoom-in, and whether the amount of requested zooming in is sufficient for arranging at least one of the alerts represented in the aggregated alert indicator to be counted in a separate time sub-interval from other alerts represented in the aggregated alert indicator.

Responsive to the determination, at operation 310, a zoomed-in version of the monitored characteristic graph 202 is displayed having the indicated time sub-interval expanded and a plurality of alert indicators replacing the aggregated alert indicator that was disaggregated. For example, if the time sub-block in which the aggregated alert indicator 228 was selected for zoom-in, the zoomed-in version of the graph 202 would have a news alert indicator and an event alert indicator displayed at respective times in the now expanded time sub-block that was selected for zooming-in. In some embodiments, the disaggregation and display of the disaggregated alert indicators may be performed in accordance with the process described in relation to FIG. 6.

If, at operation 306, it was determined that a zoom-out operation was communicated, then at operation 312 it is determined whether two or more alert indicators in the selected time sub-interval(s) should be aggregated.

Based on the determination, at operation 314, aggregation of the identified two or more alert indicators is performed. After the aggregation, the zoomed-out version of the monitored characteristic graph would be displayed with an aggregated alert indicator replacing the identified two or more alert indicators. For example, if a zoom-out operation were to be indicated of the time interval that includes the alert indicators 224 and 228 shown in FIG. 2, the resulting zoomed-out version of graph 202 will display a new aggregated alert indicator indicating 2 news alerts and 1 event alert instead of the alert indicators 224 and 228.

After either operation 310 or 314, optionally, the operator may select an alert indicator at operation 316 to display alert information. An example alert information display panel 208 was shown in FIG. 2, in response to the alert indicator 229 being selected. The displayed alert information may include information describing each of the alerts represented in the selected alert indicator. In some embodiments, selecting an alert indicator once will display the alert information, and selecting the alert indicator a second time will close the displayed alert information.

In some embodiments, in response to selecting an alert indicator, the system automatically selects a predefined template for the user interface (e.g., user interface 200). The predefined template may define one or more panels or windows to be displayed on the user interface, with each of the panels providing information that is relevant to the event or event type that underlies the selected alert indicator. The predefined templates enable the system to automatically and dynamically populate the user interface with information most helpful to resolve the particular selected alert.

In some embodiments, while executing process 300, client device 110 (or more particularly a browser on the client device) may communicate with a web server component on computer system 102 to receive the alert data, the trading data, interface format information, event type-based template information, etc., which the web server may obtain from the surveillance alert monitoring application 120. The alert data and trading data may include real-time information and historical information stored by surveillance management computer system 102.

It should be appreciated that process 300 is an example, and in various embodiments one or more operations may be combined with other operations, performed in an order other than that shown in FIG. 3, or may be omitted while displaying alerts on the user interface.

Description of FIG. 4

FIG. 4 shows examples of the zoom-in capability of a surveillance alert user interface screen such as the display screen in FIG. 2, according to some embodiments. The monitored characteristic graph 202 that was shown in the surveillance alert user interface 200 shown in FIG. 2, is replicated at the top of FIG. 4. More particularly, graph 404 shows an example when the time interval including alert indicators 224 and 228 in graph 202 is zoomed-in. As shown on graph 404, that selected time interval is now spatially expanded and, along with more details being shown in the price movement 212, the spatial separation between the alert indicators 224 and 228 has increased in graph 404. Graph 404 may be referred to as a zoomed-in graph 202.

When a zoom-in operation is performed on graph 404, specifically zooming in on the time interval that includes alert indicator 228, the processing system determines that the indicated amount of zooming in causes a time granularity that separates the occurrence times of the news alert and the event alert that was represented in the alert indicator 228. For example, graph 404 may have counted events in time intervals of 2 minutes each resulting in the news alert and the event alert were combined in the same time interval to generate indicator 228, whereas graph 406 may have events counted in 1 minute intervals at which point that news alert and the event alert are counted in different time intervals. Then the news alert and the event alert are shown in separate alert indicators 408 and 410 respectively, in correspondingly separate time intervals, in graph 406 which is a zoomed-in graph 404 (may also be referred as a further zoomed-in graph 202).

In addition to allowing the operator to drill down into a granularity sufficient to separately identify respective alerts that occur close together, the zooming in operation also uncovers aspects that may remain invisible or difficult to detect at lower time granularity. For example, whereas in graph 202 (the lowest time granularity graph on FIG. 4) the relationship between the price movement 212 and the threshold band 216 in the time period 09:30-10:00 hrs is not easily visible, the zoomed in graph (graph 404) and the further zoomed in graph (graph 406) show with increasing clarity how the price movement 212 moves out of the threshold band 216.

Description of FIG. 5

FIG. 5 shows an example process 500 for displaying alert indicators on a graph such as, for example, the graph 202 in FIG. 2 so that the associated alerts can be quickly and efficiently responded to by an operator or other user, according to some embodiments. In some embodiments, process 500 may be performed by one or more of the modules 122 and 124.

Process 500 may begin at operation 502. At operation 502, an initial set of time intervals is generated. The initial set of time intervals may correspond to a default time granularity.

At operation 504, event counters are initialized for the set of time intervals. For example, a respective event counter is associated with each time interval in the set of time intervals and initialized.

Operations 506-516 provides for evaluating alert indicators to be displayed in respective time intervals in the set of time intervals, and then refining the alert indicators when they are found to overlap with another time interval. Having initialized the event counters at operation 504, at operation 506, a next time interval to be considered is selected from the set. In some embodiments, the selection proceeds in order of time (e.g., in order of the earliest time interval in the displayed entire time interval to the last time interval).

At operation 508, the number of events that occurred in the selected time interval is counted. This may be based on real-time information received from the trading system 104 and/or historical event information such as that in database 126.

At operation 510, an icon is generated for the alert indicator that would represent the events and counts for the selected time interval. The icon is generated virtually by rendering the icon in memory. In the illustrated embodiments, a circle shape is used for an icon when only a symbol is included, and an oval shape is used when more than only a symbol is included. However, embodiments are not limited to particular shapes or sizes for icons.

At operation 512, the pixel length of the icon or its length in time is determined. As noted above, the icon may be generated virtually. The virtually generated icon may have one or more symbols (e.g., a symbol and a count for each event type that occurred in the selected time interval) and, following the symbol, either no number (e.g., exactly one event of that type of event type) or a number comprising one or more digits. The pixel length is determined as the number of pixels from left to right in the generated virtual icon. The time length is the time interval represented by the spatial length of the generated virtual icon in the to be rendered graph.

At operation 514 it is determined whether the alert icon of the selected time interval overlaps with one or more adjacent time intervals. For example, if the calculated time length of the virtually rendered icon is greater than the length of the current time interval, it overlaps one or more neighboring time intervals. Note that when the time granularity is very small, the time length of a virtual icon may overlap more than the immediately neighboring time intervals.

If at operation 514 it is determined that no overlap occurs, then process 500 proceeds to operation 506 to select the next time interval in the set and perform operations 506-516. If at operation it is determined that the selected time interval is the last time interval in the set, then process 500 may terminate.

If at operation 514, it is determined that overlap does occur, then at operation 516, the selected time interval is combined with the overlapping time intervals, and the set of time intervals is updated by replacing the selected time interval and the time interval(s) that overlapped with the selected time interval by a combined time interval that combines the selected time interval and the time interval(s) that overlapped with the selected time interval. After updating the set, process 500 proceeds to operation 504 to initialize event counters for the respective time intervals in the updated set, and thereafter proceed to operations 506-516.

As noted above, process 500 may terminate at operation 514 if no more time intervals in the set are yet to be processed by counting alerts. In some embodiments, a maximum number of iterations may be set in addition to, or in place of, the termination criteria at operation 514.

The generated alert indicators may be stored in a memory (e.g., memory 120) as they are generated. For example, a linked list or table data structure can be used to store the set of time intervals, counts corresponding to the respective time intervals, and the alert icons corresponding to the respective time intervals, in a manner that is efficient to update (e.g., to update time intervals etc., as they are combined due to icon overlap). Subsequent to process 500, the generated plurality of alert indicators can be displayed on the corresponding graph. For example, the set of alert indicators shown in graph 202 in FIG. 2 may be generated by process 500, in some embodiments.

It should be appreciated that process 500 is an example, and in various embodiments one or more operations may be combined with other operations, performed in an order other than that shown in FIG. 5, or may be omitted generating the plurality of alerts to be displayed.

Description of FIG. 6

FIG. 6 shows an example selection of a time interval on a graph, such as that shown in FIG. 5, to be zoomed in (expanded), according to some embodiments.

The indicated area 602 may be selected by mouse or on a touch screen to indicate the time interval to be zoomed-in on. For example, zooming in can be indicated by point and drag (are 602) along the x-axis. The zoom operation may result in the major/minor gridlines, and x-axis labels being displayed as per specific data granularities (e.g., 1 year, 6 months, 3 months, 1 month, 3 weeks, 1 week, 1 day, hours, minutes, milli seconds). Embodiments may provide one or more undo options to progressively undo a sequence of zoom in operations (e.g., the sequence of two zoom in operations in FIG. 4), or to reset to a default granularity and initial start time.

Description of FIG. 7

FIG. 7 shows an example surveillance alert user interface 700 showing how event aggregation changes with graph size, according to some embodiments. The monitored characteristic graph 702 shows the price movement (the solid line) of a selected securities instrument over multiple days (e.g., from January 2 to February 17). The corresponding plurality of alert indicators, including several aggregated alert indicators, are displayed on the monitored characteristic graph 702.

The surveillance alert user interface 700 also includes a volume movement graph 704 that provides trade volume information in correlation with the price movement shown in graph 702, an alert details panel 706, and an alert listings panel 708. As described in relation to FIG. 2, this additional information provides the operator or other user with contextual information to quickly and efficiently respond to a particular alert indicator displayed on graph 702.

Event aggregations in example embodiments are responsive to graph resizing. As shown below in FIG. 8, as the graph area narrows, the time granularities are automatically adjusted, and the counts are recalculated based on the time intervals.

Description of FIG. 8

FIG. 8 shows another example surveillance alert user interface 800 showing how event aggregation changes with graph size, according to some embodiments. User interface 800 is obtained when graph 702 shown in FIG. 7 is made spatially smaller to yield graph 802. The narrowing or contracting of the spatial length of graph 802 can be performed by a mouse operation or by touch on a touch screen.

As shown, graphs 802 and 804, corresponding to contractions of graphs 702 and 704, are displayed along with panels 806 and 808 having been expanded to fill up the user interface 800. When the operator makes any of the graphs 702-708 expand or contract, one or more of the other graphs may be automatically adjusted to organize surveillance alert user interface 800.

The contraction operation causes the displayed alert indicators displayed on the monitored characteristic graph 702 to be evaluated to determine whether there will be overlap, and if so, to aggregate the respective alert indicators as necessary. For example, the contraction operation causes the respective alert indicators 710 and 712 shown in monitored characteristic graph 702 to be combined into a single aggregated alert indicator 810 shown in the monitored characteristic graph 802.

Description of FIG. 9

FIG. 9 shows an event details panel 900 that is displayed in response to clicking on a corresponding event alert, according to some embodiments. For example, the panel 900 may be displayed when the operator clicks on alert indicator 910. Alert indicator 910 represents 1 news alert and 3 event alerts. Thus, the event details displayed in the panel 900 may include the details 904 of the news alert, and details 914 of one or more of the 3 event alerts that were aggregated in alert indicator 910. In some embodiments, a relevant portion of the monitored characteristic graph (e.g., graph 202) can be shown in association with a particular alert detail. For example, a portion (or clip) 912 of the price movement 212 is shown closely associated with the corresponding alert details.

The symbol corresponding to each type of event can be displayed 908 in association with a respective alert detail. For example, the symbol 908 is shown in association with the corresponding alert details 904. A "read more" message 906 on the alert details panel may be made clickable so that further information can be efficiently displayed. While the symbol is determined by event type, a characteristic of the symbol (e.g., size, color, etc.) may be varied to represent different levels of the particular event type. In the illustrated example, the note icon for the news alert indicator 908 is displayed in a red color indicating that the news is deemed to be price sensitive, whereas alert indicators for news that are not deemed to be price sensitive are rendered in a different (e.g., blue) color.

The event details panel may show the list of alerts, news, and other events in the timeline in a list representation sorted by time. In some embodiments, there is a two-way interaction between the alert indicators and corresponding event details. For example, when the operator clicks on an aggregate alert indicator, a list view may show the details of the corresponding events including security, participants, alert text, news details, etc. When the operator next clicks on an event in the list, the timeline may filter to an event history.

Description of FIG. 10

FIGS. 10A and 10B show example pseudo code for event aggregation, in accordance with some embodiments. The pseudo code describes event aggregation in a manner similar to process 500.

FIG. 10A shows a structure OutData that is used to store generated alert indicators and that includes position information for the alert indicators, time information, event type, pixel length/width, and associated events. The structure IncomingData enables specifying incoming event information with a high time granularity (e.g., nano seconds, milliseconds) for each event.

FIG. 10B shows a function getChartDrawData( ) that is run to generate the plurality of alert indicators to be displayed on a monitored characteristic graph (e.g., graph 202). The function is called with input data specified according to IncomingData and populates the OutData structure with the plurality of alert indicators. The function is configured to loop a predefined maximum number of times for each time interval counting events and uses another function getIconEventsSize( ) to get the size of the alert indicator icon. The size is then checked to see if it has reached a maximum or the number of iterations has reached a maximum.

It should be understood that the pseudocode is an example, and that embodiments may include processes that have similar operations as defined by the pseudocode of FIGS. 10A-B or that are different from the pseudocode.

Description of FIG. 11

FIG. 11 is a block diagram of an example computing device 1100 (which may also be referred to, for example, as a "computing device," "computer system," or "computing system") according to some embodiments. In some embodiments, the computing device 1100 includes one or more of the following: one or more processors 1102 (which may be referred to as "hardware processors" or individually as a "hardware processor"); one or more memory devices 1104; one or more network interface devices 1106; one or more display interfaces 1108; and one or more user input adapters 1110. Additionally, in some embodiments, the computing device 1100 is connected to or includes a display device 1112. As will explained below, these elements (e.g., the processors 1102, memory devices 1104, network interface devices 1106, display interfaces 1108, user input adapters 1110, display device 1112) are hardware devices (for example, electronic circuits or combinations of circuits) that are configured to perform various different functions for the computing device 1100. In some embodiments, these components of the computing device 1100 may be collectively referred to as computing resources (e.g., resources that are used to carry out execution of instructions and include the processors (one or more processors 1102), storage (one or more memory devices 1104), and I/O (network interface devices 1106, one or more display interfaces 1108, and one or more user input adapters 1110). In some instances, the term processing resources may be used interchangeably with the term computing resources. In some embodiments, multiple instances of computing device 1100 may arranged into a distributed computing system.

In some embodiments, each or any of the processors 1102 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1102 uses an instruction set architecture such as x86 or Advanced RISC Machine (ARM).

In some embodiments, each or any of the memory devices 1104 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1102). Memory devices 1104 are examples of non-transitory computer-readable storage media.

In some embodiments, each or any of the network interface devices 1106 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), LTE Pro, Fifth Generation New Radio (5G NR) and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, data is communicated over an electronic data network. An electronic data network includes implementations where data is communicated from one computer process space to computer process space and thus may include, for example, inter-process communication, pipes, sockets, and communication that occurs via direct cable, cross-connect cables, fiber channel, wired and wireless networks, and the like. In certain examples, network interface devices 1106 may include ports or other connections that enable such connections to be made and communicate data electronically among the various components of a distributed computing system.

In some embodiments, each or any of the display interfaces 1108 is or includes one or more circuits that receive data from the processors 1102, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1112, which displays the image data. Alternatively or additionally, in some embodiments, each or any of the display interfaces 1108 is or includes, for example, a video card, video adapter, or graphics processing unit (GPU).

In some embodiments, each or any of the user input adapters 1110 is or includes one or more circuits that receive and process user input data from one or more user input devices (not shown in FIG. 11) that are included in, attached to, or otherwise in communication with the computing device 1100, and that output data based on the received input data to the processors 1102. Alternatively or additionally, in some embodiments each or any of the user input adapters 1110 is or includes, for example, a PS/2 interface, a USB interface, a touchscreen controller, or the like; and/or the user input adapters 1110 facilitates input from user input devices (not shown in FIG. 11) such as, for example, a keyboard, mouse, trackpad, touchscreen, etc.

In some embodiments, the display device 1112 may be a Liquid Crystal Display (LCD) display, Light Emitting Diode (LED) display, or other type of display device. In embodiments where the display device 1112 is a component of the computing device 1100 (e.g., the computing device and the display device are included in a unified housing), the display device 1112 may be a touchscreen display or non-touchscreen display. In embodiments where the display device 1112 is connected to the computing device 1100 (e.g., is external to the computing device 1100 and communicates with the computing device 1100 via a wire and/or via wireless communication technology), the display device 1112 is, for example, an external monitor, projector, television, display screen, etc.

In various embodiments, the computing device 1100 includes one, or two, or three, four, or more of each or any of the above-mentioned elements (e.g., the processors 1102, memory devices 1104, network interface devices 1106, display interfaces 1108, and user input adapters 1110). Alternatively or additionally, in some embodiments, the computing device 1100 includes one or more of: a processing system that includes the processors 1102; a memory or storage system that includes the memory devices 1104; and a network interface system that includes the network interface devices 1106. Alternatively, or additionally, in some embodiments, the computing device 1100 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 1102 and the network interface devices 1106; or the single SoC (or the multiple SoCs) may include the processors 1102, the network interface devices 1106, and the memory devices 1104; and so on. The computing device 1100 may be arranged in some embodiments such that: the processors 1102 include a multi or single-core processor; the network interface devices 1106 include a first network interface device (which implements, for example, WiFi, Bluetooth, NFC, etc.) and a second network interface device that implements one or more cellular communication technologies (e.g., 3G, 4G LTE, CDMA, etc.); the memory devices 1104 include RAM, flash memory, or a hard disk. As another example, the computing device 1100 may be arranged such that: the processors 1102 include two, three, four, five, or more multi-core processors; the network interface devices 1106 include a first network interface device that implements Ethernet and a second network interface device that implements WiFi and/or Bluetooth; and the memory devices 1104 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the surveillance management computer system 102, display device 110, and electronic trading system 104, each of which will be referred to individually for clarity as a "component" for the remainder of this paragraph, are implemented using an example of the computing device 1100 of FIG. 11. In such embodiments, the following applies for each component: (a) the elements of the 1100 computing device 1100 shown in FIG. 11 (i.e., the one or more processors 1102, one or more memory devices 1104, one or more network interface devices 1106, one or more display interfaces 1108, and one or more user input adapters 1110), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1104 (e.g., in various embodiments, in a volatile memory device such as a RAM or an instruction register and/or in a non-volatile memory device such as a flash memory or hard disk) and all actions described herein as performed by the software modules are performed by the processors 1102 in conjunction with, as appropriate, the other elements in and/or connected to the computing device 1100 (i.e., the network interface devices 1106, display interfaces 1108, user input adapters 1110, and/or display device 1112); (c) alternatively or additionally, to the extent it is described herein that the component processes and/or otherwise handles data, in some embodiments, such data is stored in the memory devices 1104 (e.g., in some embodiments, in a volatile memory device such as a RAM and/or in a non-volatile memory device such as a flash memory or hard disk) and/or is processed/handled by the processors 1102 in conjunction, as appropriate, the other elements in and/or connected to the computing device 1100 (i.e., the network interface devices 1106, display interfaces 1108, user input adapters 1110, and/or display device 1112); (d) alternatively or additionally, in some embodiments, the memory devices 1102 store instructions that, when executed by the processors 1102, cause the processors 1102 to perform, in conjunction with, as appropriate, the other elements in and/or connected to the computing device 1100 (i.e., the memory devices 1104, network interface devices 1106, display interfaces 1108, user input adapters 1110, and/or display device 1112), each or any combination of actions described herein as performed by the component and/or by any software modules described herein as included within the component. Consistent with the preceding paragraph, as one example, in an embodiment where an instance of the computing device 1100 is used to implement the client device 110, the memory devices 1104 could load the files associated with the surveillance alert user interface (e.g., HTML, XML, JavaScript files), and/or store the data described herein as processed and/or otherwise handled by the web browser applications 124-122 and/or the client device 110. Processors 1102 could be used to operate a rendering module, networking module, and JavaScript module, and/or otherwise process the data described herein as processed by the web browser application 124-122 and/or the client device 110.

The hardware configurations shown in FIG. 11 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 11, (e) via other hardware arrangements, architectures, and configurations, and/or via combinations of the technology described in (a) through (e).

Technical Advantages of Described Subject Matter

In certain example embodiments, a surveillance alert user interface is provided that, in contrast to conventional user interfaces that may not provide adequate clarity or information with respect to various alerts that are generated in a monitored system, enables operators to quickly and efficiently identify, isolate and respond to such alerts. Example embodiments enable this enhanced capability by performing a process of aggregating alerts in time buckets in a manner that is different from conventional systems and moreover by dynamically adapting the process of aggregating alerts in time buckets in a manner that is responsive to alerts in other time buckets and the size and layout of associated graphs that display the monitored characteristics. The enhanced capability is enabled additionally in some embodiments by, in contrast to conventional systems in which the operator has to select overlapping individual alert indicators in a time bucket one by one to have their respective information displayed, providing for the alert information of all the individual alerts to be shown in a single alert details panel in response to the operator selecting a corresponding aggregated alert indicator, thereby enabling the operator to more quickly view details of all the individual alerts represented in the aggregated alert. Still further, some example embodiments, automatically associate other information that may be relevant to particular alerts (e.g., using view templates accessed based on a type of alert), and display the other information in the same timeline, further facilitating the operator's capability to respond quickly and effectively.

Embodiments may also improve the speed and responsiveness of the computer system that displays the surveillance alert user interface. When rendering the user interface in a time bucket that has dozens of alerts, in contrast to conventional systems that may iterate over a list of the dozens of alerts to render the corresponding alerts one by one to the user interface over numerous processor cycles, embodiments may substantially speed up the user interface display by rendering only a single icon of an aggregated alert. Additionally, during the rendering of the user interface, an aggregated alert indicator that represents dozens of individual alert indicators may occupy significantly less memory space (i.e., a smaller memory footprint) than the collection of individual alert indicators, thereby improving the efficiency of memory utilization in the client device or other display device that displays the user interface. The improved rendering speeds of the user interface may also improve the speed with which the incoming real-time event alerts can be displayed on the user interface, thereby improving the responsiveness of the system to real-time events.

In modern networks operators are often in situations where they are even temporarily limited to small screen sizes (e.g., tablets, smartphone, etc.). Some embodiments, by being responsive to the volume of alerts in particular time buckets and to available display space for the graphs, dynamically expands the time bucket over which aggregation is performed for a particular aggregated alert indicator in a manner that is adaptive to the size of alert indicators in terms of pixel length or length in time relative to the graph's time granularity. Thus, the aggregated alert indicators provided in some embodiments also present a clear, more easily comprehensible view of system alerts to the operator in a manner that is adaptive even to smaller screen sizes.

The technical features described herein may, by improving the operator's capabilities to respond quickly and effectively to issues in a monitored system, thus improve the reliability and performance of the monitored computer system.

Selected Terminology

The elements described in this document include actions, features, components, items, attributes, and other terms. Whenever it is described in this document that a given element is present in "some embodiments," "various embodiments," "certain embodiments," "certain example embodiments," "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can be therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

Additional Applications of Described Subject Matter

Although examples are provided herein with respect to the trading of equities (i.e., equity securities/stock), the technology described herein may also be used, mutatis mutandis, with any type of asset, including but not limited to other types of financial instruments (e.g., bonds, options, futures), currencies, cryptocurrencies, and/or non-financial assets. Further, although examples are provided herein with respect to electronic trading platforms, the technology described herein may also be used, mutatis mutandis, with other types of distributed computing systems, including but not limited to telecommunication networks, payment processing systems, industrial control systems, parallel scientific computation systems, smart contract systems, transaction processing systems, distributed databases, and/or other types of distributed systems.

Although process steps, algorithms or the like, including without limitation with reference to [FIGS. 3 and 5], may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system comprising:
 a processing system comprising instructions that, when executed by at least one hardware processor of the processing system, cause the at least one hardware processor to perform operations comprising:
  displaying a user interface screen comprising at least a first graph, wherein the first graph plots a first characteristic of a first monitored item over a first time interval;
  displaying, on the first graph, a plurality of alert indicators correlated with respectively different time sub-intervals in the first time interval, wherein the plurality of alert indicators include at least one aggregated alert indicator displayed correlated to a first time sub-interval;
  responsive to a first user input indicating zooming in on an indicated time interval comprising the first time sub-interval:
   determining whether to disaggregate the at least one aggregated alert indicator; and
   based on the determining, displaying a second plurality of alert indicators instead of the at least one aggregated alert indicator on a zoomed-in first graph, wherein respective alert indicators of the second plurality of alert indicators are correlated to respective second time sub-intervals within the first time sub-interval; and
  responsive to a second user input indicating to display information associated with an alert indicator of the plurality of alert indicators, displaying information associated with the alert indicator,
 wherein the at least one hardware processor is further configured to perform operations comprising:
 dividing the first time interval to a set of intermediate time sub-intervals based on a first time granularity;
 initializing a respective event counter for each intermediate time sub-interval in the set;
 performing, for each intermediate time sub-interval in the set, ordered according to time:
  counting a total number of events occurring in the intermediate time sub-interval;
  generating an intermediate alert indicator corresponding to the counted total number of events;
  determining an icon length and/or time length for the intermediate alert indicator; and
  when it is determined, based on the determined icon length and/or time length, that the intermediate alert indicator overlaps with one or more other intermediate time sub-intervals in the set;
   combining the intermediate time sub-interval with the one or more other intermediate time sub-intervals and updating the set by replacing the intermediate time sub-interval and the one or more other intermediate time sub-intervals with the combined intermediate time sub-interval; and
initializing event counters for the set, after the updating.

2. The computer system according to claim 1, wherein the at least one hardware processor is further configured to perform operations comprising:
responsive to a third user input indicating zooming out a second indicated time interval comprising one or more of the respectively different time sub-intervals:
determining whether to aggregate a subset of the plurality of alert indicators within the second indicated time interval; and
based on the determining, displaying a second aggregated alert indicator instead of the subset on a zoomed-out first graph, wherein the second aggregated alert indicator is correlated to a third time sub-interval that includes time sub-intervals correlated with respective alert indicators in the subset.

3. The computer system according to claim 1, wherein displaying, on the first graph, a plurality of alert indicators correlated with respectively different time sub-intervals in the first time interval comprises:
dynamically adjusting, based on a size of each of one or more intermediate versions of the first aggregated alert indicator, a time over which events are aggregated to determine the first aggregated alert indicator.

4. The computer system according to claim 3, wherein sizes of respective intermediate versions of the first aggregated alert indicator are different based on at least one of event types of the events and a number of the events of each event type.

5. The computer system according to claim 1, wherein the displaying, on the first graph, a plurality of alert indicators correlated with respectively different time sub-intervals in the first time interval comprises arranging the plurality of alert indicators on the first graph without overlap with each other.

6. The computer system according to claim 1, wherein the displaying, on the first graph, a plurality of alert indicators correlated with respectively different time sub-intervals in the first time interval comprises displaying at most one alert indicator in correlation with a respective one of the different time sub-intervals.

7. The computer system according to claim 1, wherein the operations further comprise:
during the performing, storing the determined intermediate alert indicators for each time sub-interval in a memory,
wherein the displaying, on the first graph, a plurality of alert indicators correlated with respectively different time sub-intervals in the first time interval comprises, after the performing, displaying, on the first graph, the determined intermediate alert indicators correlated with respective time sub-intervals in the set of intermediate time sub-intervals.

8. The computer system according to claim 1,
wherein counting a total number of events occurring in the intermediate time sub-interval comprises separately counting a number of events for each of a plurality of event types, and
wherein generating an intermediate alert indicator corresponding to the counted total number of events comprises generating the intermediate alert indicator to include, for each event type for which the counted total is more than a threshold number, an identifier and the counted total number of events.

9. The computer system according to claim 1, wherein the icon length is a pixel width.

10. The computer system according to claim 1, wherein the operations further comprise:
displaying a second graph concurrently with the first graph;
displaying, on the second graph, a plurality of second alert indicators correlated with respectively different time sub-intervals in the first time interval; and
responsive to the first user input indicating zooming in, displaying a zoomed-in second graph concurrently with said zoomed-in first graph.

11. The computer system according to claim 10, wherein the second graph plots the first characteristic of a second monitored item over the first time interval.

12. The computer system according to claim 1, wherein the at least one hardware processor is further configured to perform further operations comprising:
displaying a second graph in the user interface screen concurrently with the first graph, wherein the second graph plots participant activity associated with the first monitored item over the first time interval.

13. The computer system according to claim 1, wherein the operations further comprise:
displaying bands of expected values for the first characteristic of the first monitored item over the first time interval.

14. The computer system according to claim 1, wherein responsive to a second user input indicating to display information associated with an alert indicator of the plurality of alert indicators, displaying information associated with the alert indicator comprises:
identifying a user interface template in accordance with the alert indicator indicated by the second user input; and
displaying said information associated with the alert indicator based on the identified user interface template.

15. The computer system according to claim 1, wherein responsive to a second user input indicating to display information associated with an alert indicator of the plurality of alert indicators, displaying information associated with the alert indicator comprises:
determining that the second user input indicated an aggregated alert indicator; and
in response to the determining, displaying alert information for a plurality of alert indicators represented in the aggregated alert indicator.

16. A method performed on a computer system, the method comprising:
displaying a user interface screen comprising at least a first graph, wherein the first graph plots a first characteristic of a first monitored item over a first time interval;
displaying, on the first graph, a plurality of alert indicators correlated with respectively different time sub-intervals in the first time interval, wherein the plurality of alert indicators include at least one aggregated alert indicator displayed correlated to a first time sub-interval;
responsive to a first user input indicating zooming in on an indicated time interval comprising the first time sub-interval:
determining whether to disaggregate the at least one aggregated alert indicator; and
based on the determining, displaying a second plurality of alert indicators instead of the at least one aggregated alert indicator on a zoomed-in first graph, wherein respective alert indicators of the second plurality of alert indicators are correlated to respective second time sub-intervals within the first time sub-interval; and responsive to a second user input indicating to display information associated with an alert indicator of the plurality of alert indicators, displaying information associated with the alert indicator, wherein the at least one hardware processor is further configured to perform operations comprising:

dividing the first time interval to a set of intermediate time sub-intervals based on a first time granularity;

initializing a respective event counter for each intermediate time sub-interval in the set;

performing, for each intermediate time sub-interval in the set, ordered according to time:

counting a total number of events occurring in the intermediate time sub-interval;

generating an intermediate alert indicator corresponding to the counted total number of events;

determining an icon length and/or time length for the intermediate alert indicator; and when it is determined, based on the determined icon length and/or time length, that the intermediate alert indicator overlaps with one or more other intermediate time sub-intervals in the set:

combining the intermediate time sub-interval with the one or more other intermediate time sub-intervals and updating the set by replacing the intermediate time sub-interval and the one or more other intermediate time sub-intervals with the combined intermediate time sub-interval; and initializing event counters for the set, after the updating.

17. The method according to claim 16, wherein displaying, on the first graph, a plurality of alert indicators correlated with respectively different time sub-intervals in the first time interval comprises:

dynamically adjusting, based on a size of each of one or more intermediate versions of the first aggregated alert indicator, a time over which events are aggregated to determine the first aggregated alert indicator.

18. A non-transitory computer readable storage medium storing instructions for use with a computer system, the computer system including at least one hardware processor, the stored instructions comprising instructions configured to cause the at least one hardware processor to perform operations comprising:

displaying a user interface screen comprising at least a first graph, wherein the first graph plots a first characteristic of a first monitored item over a first time interval;

displaying, on the first graph, a plurality of alert indicators correlated with respectively different time sub-intervals in the first time interval, wherein the plurality of alert indicators include at least one aggregated alert indicator displayed correlated to a first time sub-interval;

responsive to a first user input indicating zooming in on an indicated time interval comprising the first time sub-interval:

determining whether to disaggregate the at least one aggregated alert indicator; and based on the determining, displaying a second plurality of alert indicators instead of the at least one aggregated alert indicator on a zoomed-in first graph, wherein respective alert indicators of the second plurality of alert indicators are correlated to respective second time sub-intervals within the first time sub-interval; and responsive to a second user input indicating to display information associated with an alert indicator of the plurality of alert indicators, displaying information associated with the alert indicator, wherein the at least one hardware processor is further configured to perform operations comprising:

dividing the first time interval to a set of intermediate time sub-intervals based on a first time granularity;

initializing a respective event counter for each intermediate time sub-interval in the set;

performing, for each intermediate time sub-interval in the set, ordered according to time:

counting a total number of events occurring in the intermediate time sub-interval;

generating an intermediate alert indicator corresponding to the counted total number of events;

determining an icon length and/or time length for the intermediate alert indicator; and when it is determined, based on the determined icon length and/or time length, that the intermediate alert indicator overlaps with one or more other intermediate time sub-intervals in the set;

combining the intermediate time sub-interval with the one or more other intermediate time sub-intervals and updating the set by replacing the intermediate time sub-interval and the one or more other intermediate time sub-intervals with the combined intermediate time sub-interval; and initializing event counters for the set, after the updating.

19. The non-transitory computer readable storage medium according to claim 18, wherein displaying, on the first graph, a plurality of alert indicators correlated with respectively different time sub-intervals in the first time interval comprises:

dynamically adjusting, based on a size of each of one or more intermediate versions of the first aggregated alert indicator, a time over which events are aggregated to determine the first aggregated alert indicator.

* * * * *